United States Patent [19]

Yonekubo

[11] 4,283,110

[45] Aug. 11, 1981

[54] OPTICAL SYSTEM FOR DISCUSSION-MICROSCOPE

[75] Inventor: Ken Yonekubo, Hachiouji, Japan

[73] Assignee: Olympus Optical Co., Ltd., Tokyo, Japan

[21] Appl. No.: 133,359

[22] Filed: Mar. 24, 1980

[30] Foreign Application Priority Data

Mar. 30, 1979 [JP]  Japan ................................. 54-37972

[51] Int. Cl.³ ............................................ G02B 21/18
[52] U.S. Cl. ...................................... 350/33; 350/51; 350/54
[58] Field of Search ....................... 350/33, 35, 36, 54, 350/171, 173, 169, 172, 81, 82, 87–91, 51

[56]  References Cited

U.S. PATENT DOCUMENTS 3,464,759  9/1969  Scholer et al. ......................... 350/36
3,994,557  11/1976  Hopkins ................................. 350/52

FOREIGN PATENT DOCUMENTS 1217099  5/1966  Fed. Rep. of Germany ............. 350/33

Primary Examiner—Jon W. Henry
Attorney, Agent, or Firm—Cushman, Darby & Cushman

[57]  ABSTRACT

An optical system for a discussion-microscope in which a relay lens is disposed in the passage of a ray flux and which is arranged so that the ray flux from the object to the eyepiece is reflected an even number of times by the intervening reflecting surfaces, whereby a number of persons may simultaneously observe uniformly oriented images of the sample.

6 Claims, 8 Drawing Figures

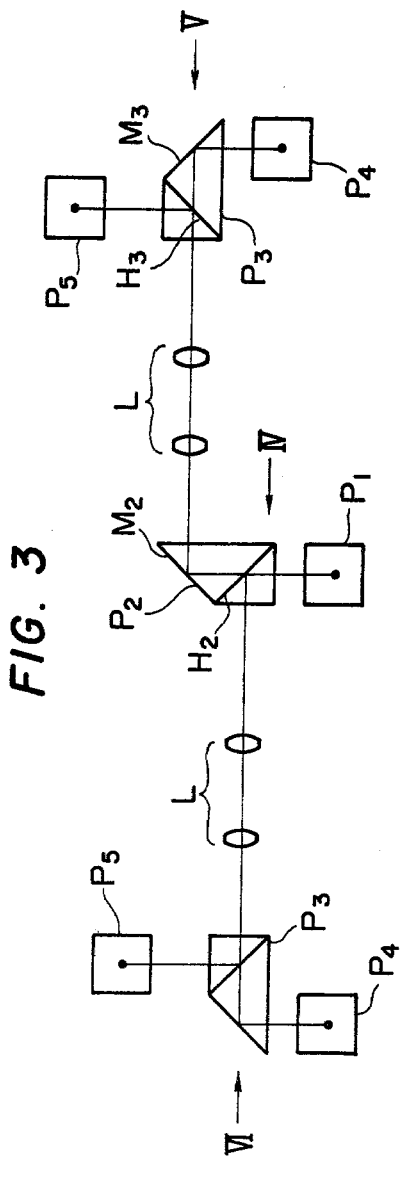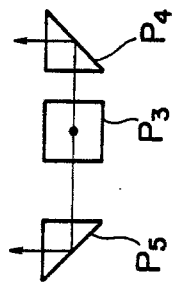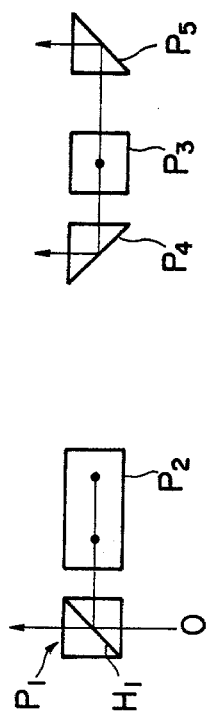

OPTICAL SYSTEM FOR DISCUSSION-MICROSCOPE

FIELD OF THE INVENTION

The present invention relates to an optical system for a discussion-microscope by which many observers can simultaneously observe the magnified images of the same sample.

DESCRIPTION OF THE PRIOR ART

The discussion-microscope is an apparatus in which the ray flux passing through the objective lens from the object is divided into many ray fluxes and by which many observers can observe the images of the object through the eyepieces. One of the defects in a conventional microscope of such a discussion-microscope is that it was inconvenient to hold discussions using this microscope because the tops and bottoms, or, rights and lefts of the images observed from different locations would be in a reversed relation with respect to each other and thus the orientations of the images observed by a number of observers would not be uniform.

SUMMARY OF THE INVENTION

The present invention overcomes the above problem and offers the discussion-microscope by which a number of persons may observe the same sample, and every observer can observe uniformly oriented images of the sample.

In the following, the discussion-microscope of the present invention is described in further detail according to the illustrated embodiment.

BRIEF DESCRIPTION OF THE DRAWINGS

How the foregoing objects and advantages are attained will appear more clearly from the following description referring to the accompanying drawings, in which:

FIGS. 3 through 6 are illustrations showing the optical system in accordance with the present invention.

DESCRIPTION OF THE PREFERRED EMBODIMENT

Figure 1:
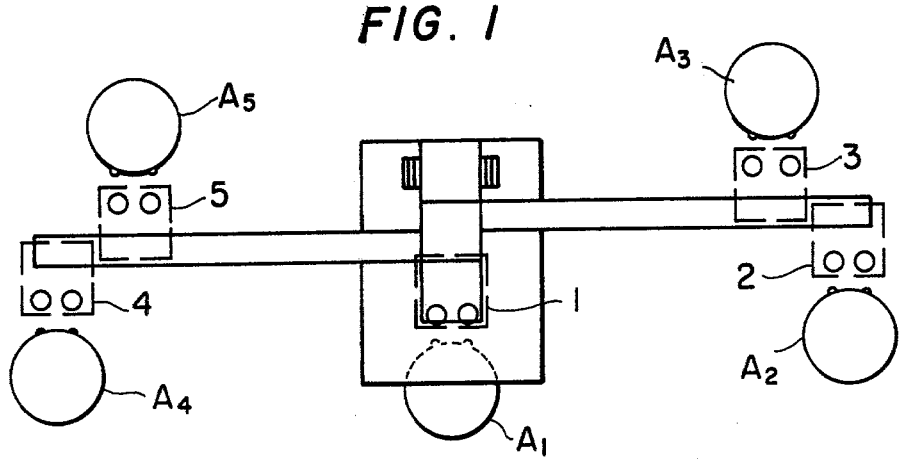
FIGS. 1 and 2 are illustrations showing construction of the discussion-microscope having the optical system in accordance with the present invention.
Figure 2:
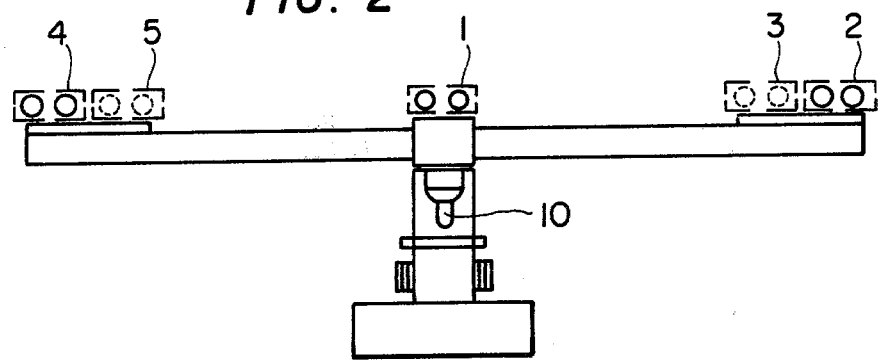

Details of the discussion-microscope of the present invention will hereunder be given based on the one embodiment illustrated in the accompanying drawings. FIG. 1 is a plan view and FIG. 2 is a elevational view of the discussion-microscope of the present invention. In the present discussion-microscope, an optical system having five pairs of eyepieces 1, 2, 3, 4 and 5 is arranged on the objective lens 10. The ray flux passing through the objective lens from the object is divided and oriented to each eyepiece by the optical system as described hereinafter, and as illustrated in FIG. 1, each observer $A_1$ through $A_5$ can simultaneously observe the magnified images of the same sample. FIG. 3 is a plan view of the optical system of the discussion-microscope in accordance with the present invention, FIG. 4 is an illustration of the same optical system seen form the direction IV, FIG. 5 is the one seen form the direction V, and FIG. 6 is the one seen from the direction VI. As illustrated in these drawings, the optical system in the discussion-microscope of the present invention comprises a prism $P_1$ having a half-mirror $H_1$ above the objective lens. A ray flux from the objective lens is divided into two ray fluxes by the said half-mirror $H_1$ of the prism $P_1$, and it is so arranged that the one ray flux going upward along the optical axis is observed by the first observer $A_1$ through an eyepiece 1. And, the other ray flux reflected by the half-mirror $H_1$ is further divided into two ray fluxes by a half-mirror $H_2$ of a prism $P_2$. One of the ray fluxes is reflected by a reflecting surface $M_2$ and goes to the right as shown in FIG. 3. This ray flux passes through a relay lens L, and is again divided into two ray fluxes by a half-mirror $H_3$ of a prism $P_3$. The ray flux passing through the half-mirror $H_3$ is reflected by the surface $M_3$ as shown in FIG. 5 and goes upward by a prism $P_4$ so that it is observed through an eyepiece 2 by a second observer $A_2$. The ray flux which passes through the half-mirror $H_2$ of the prims $P_2$ and is reflected by the half-mirror $H_3$ of the prism $P_3$ is upwardly reflected by a surface $M_5$ of a prism $P_5$ and is observed by a third observer $A_3$ through an eyepiece 3. Because the optical system, one at the left side and the other at the right side, comprising the respective sets of prisms $P_3$, $P_4$ and $P_5$ have symmetrically arranged structures, the ray flux reflected by the half-mirror $H_2$ of the prism $P_2$ in the direction of the left in FIG. 3 is observed by a fourth observer $A_4$ and a fifth observer $A_5$ through eyepieces 4 and 5, respectively, with the same functions of the prisms $P_3$, $P_4$ and $P_5$ of the right side optical system.

Figure 7:
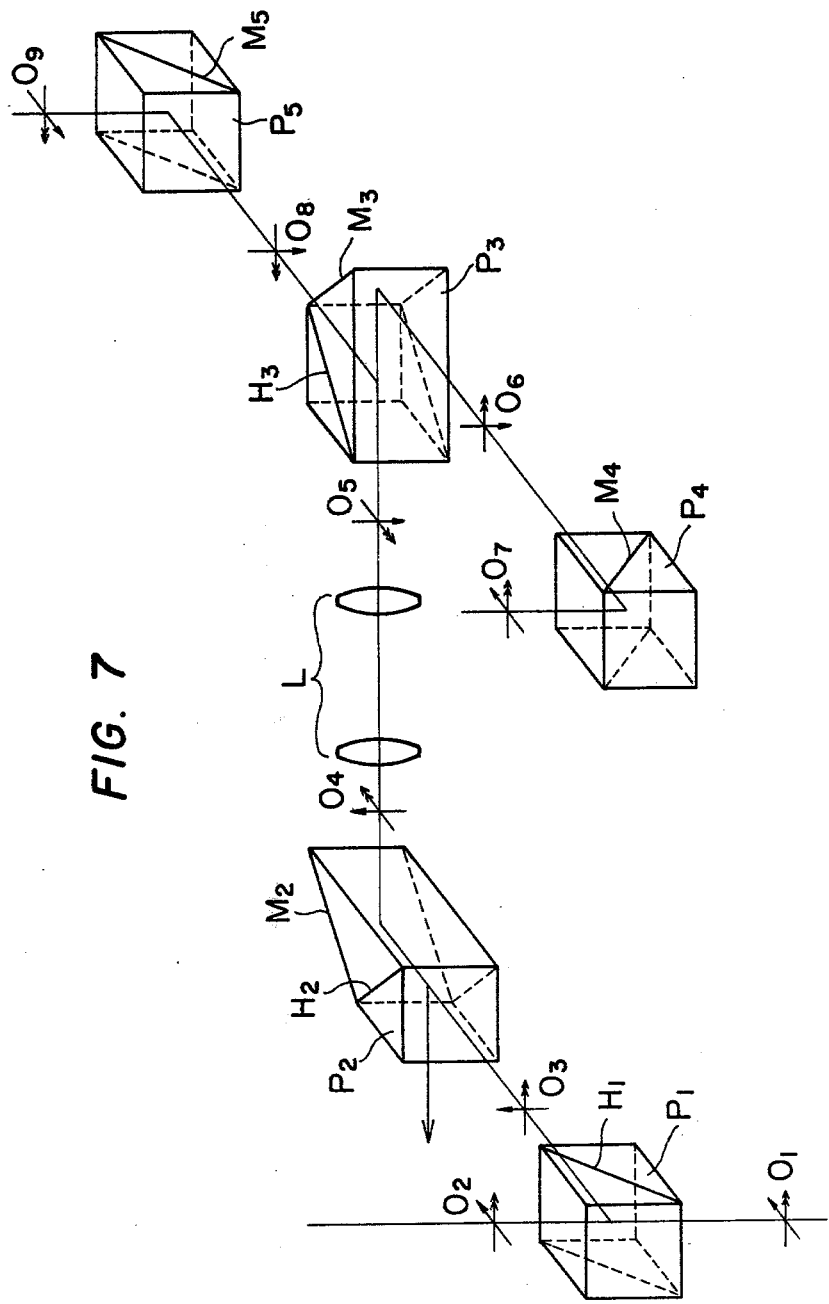
FIG. 7 is a partial perspective illustration of the optical system in accordance with the present invention.

FIG. 7 is a perspective view of the optical system according to the present invention. Because the arrangement of the left side optical system is symmetric to that of the right side optical system as described above, one of which is not shown in the drawing. The image orientation observed by each observer will hereinafter be explained according to this drawing. Assuming that the image orientation by the objective lens is $O_1$, the image orientation passing through the prism $P_1$ observed by the first observer is $O_2$, so that the orientation thereof remains the same as $O_1$. After being reflected by the half-mirror $H_1$ of the prism $P_1$, the image orientation $O_1$ becomes $O_3$, and further being reflected by the reflecting surface $M_2$ of the prism $P_2$, becomes $O_4$. After passing through the relay lens L, the image orientation becomes $O_5$ with the rights & lefts and tops & bottoms being reversed. Further, the ray flux reflected by the reflecting surface $M_3$ of the prism $P_3$ shows the image orientation as shown by $O_6$, and after being reflected by the reflecting surface $M_4$ of the prism $P_4$, the image orientation becomes that as shown by $O_7$ which is observed by the second observer. On the other hand, the ray flux reflected by the half-mirror $H_3$ of the prism $P_3$ shows the image orientation as shown by $O_8$, and after being reflected by the reflecting surface $M_5$ of the prism $P_5$, the image orientation becomes that as shown by $O_9$ which is observed by the third observer. Under this situation, the first observer and the second observer will face to the same direction but the second observer and the third observer will face each other. Therefore, although the image orientation as shown by $O_9$ and the image orientation as shown by $O_2$ and $O_7$ are in a reversed position on FIG. 7, they are observed in the same image orientations by the observers. In the same manner, the fourth and fifth observers can also observe the uniformly oriented images. Further, the symbols $O_1$ through $O_9$ are intended to show only the image orientations and not to illustrate the image forming point.

Figure 8:
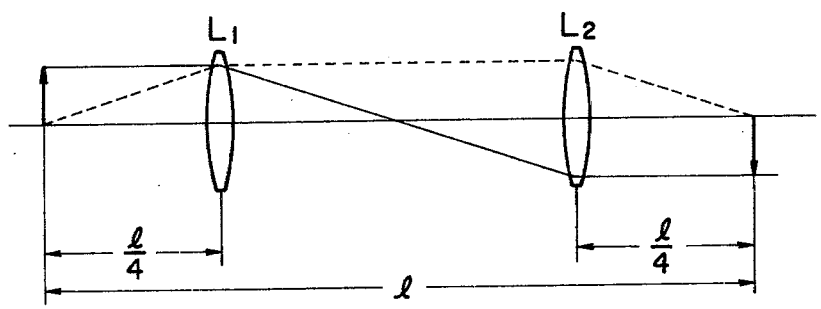
FIG. 8 shows one example of the relay lens which is used in the optical system of the present invention.

In the optical system described above, the relay lens can be located at any point in so far as it is in between the half-mirror $H_1$ and the half-mirror $H_3$. For example, as shown in FIG. 7, aside from an appropriate point between the half-mirror $H_2$ and the half-mirror $H_3$, the relay lens may well be arranged in between the half-mirror $H_1$ and the half-mirror $H_2$. In the latter case, only one relay lens is sufficient. The relay lens can be arranged beyond the half-mirror $H_3$. However, in this case, such relay lens will become necessary for each observer. FIG. 8 shows one example of the relay lens. This relay lens is of a two group afocal lens system and two groups of $L_1$ and $L_2$ have the same focal length, and, further, the rear focal point of $L_1$ and the front focal point of $L_2$ are arranged to coincide. When this relay lens is disposed in the passage of the ray flux, the image by the objective lens can be relayed in $-1\times$ (magnification). The relay lens is positioned by the adjustment of the space with respect to the image formed by the objective lens so that the image by the relay lens can be formed in the vicinity of the focal point of the eyepiece (the point where the image of the object by the objective lens is formed in an ordinary microscope). The relay lens shown in FIG. 8 is one is which the front focal point of $L_1$ and the image formed by the objective lens are coincided and the image relayed is formed at the rear focal point of $L_2$. When it is desired to have a longer distance for the desired image forming point, that is, for example, when many optical elements are to be disposed between the lens $L_2$ and the eyepiece, it may be arranged that the image by the objective lens be formed inside the front focal point of the lens $L_1$. The reverse arrangement is also true.

In view of the various arrangements of the related devices involved, it is desirable for the passages of the ray fluxes from the half-mirror $H_1$ to the reflecting surfaces $M_4$ and $M_5$ to be all in the same plane. The reflecting surfaces from the half-mirror $H_1$ to the reflecting surface $M_3$ (inclusive $H_1$ and $M_3$ per se) can be any number in so far as they are in even numbers.

As described and explained above, when the optical system for discussion-microscope of the present invention is used, it is possible for every observer to observe uniformly oriented images of the sample.

I claim:

1. An optical system for a discussion-microscope comprising a first ray flux dividing element for dividing a ray flux through an objective lens from an object into a first ray flux passing along the optical axis of the said objective lens and a second ray flux passing in a direction different from the said optical axis, a first optical element for directing the said second ray flux to approximately the same direction as the said first ray flux, a second ray flux dividing element designed for further dividing the said second ray flux and disposed in the passage of the said second ray flux, a second optical element for directing a third ray flux divided by the said second ray flux dividing element to approximately the same direction as the said first ray flux, and at least one relay lens disposed in the passage of the ray flux directed by the said first ray flux dividing element to a direction different from the optical axis of the said first ray flux, and the said second ray flux dividing element, the said first ray flux dividing element, said first optical element, the said relay lens and the said second optical element being disposed in the common plane.

2. An optical system for a discussion-microscope according to claim 1, in which at least one reflecting mirror is provided in each ray flux passage so that the said second ray flux and the said third ray flux may each be reflected an even number of times.

3. An optical system for a discussion-microscope according to claim 1, in which the said relay lens is disposed between the said first ray flux dividing element and the said second ray flux dividing element.

4. An optical system for a discussion-microscope according to claim 1, in which relay lenses are disposed between the said second ray flux dividing element and the said first optical element and between the said second ray flux dividing element and the said second optical element.

5. An optical system for a discussion-microscope according to claim 1, in which the said system comprises a third ray flux dividing element for dividing the said second ray flux having passed through the said first relay lens, a third optical element for directing a fourth ray flux divided by the said third ray flux dividing element to the same direction as the first ray flux, a fourth ray flux dividing element for further dividing the said third ray flux having passed through a second relay lens, a fourth optical element for directing a fifth ray flux divided by the said fourth ray flux dividing element to the same direction as the first ray flux, the said third ray flux dividing element, the said fourth ray flux dividing element, the third optical element and the fourth optical element being disposed in the same plane as the said first and second ray flux dividing elements, the said first and second optical elements and the said first and second relay lenses.

6. An optical system for a discussion-microscope according to claim 2, in which the said first and second relay lenses are of afocal type lens system, each comprising two groups of lenses.

* * * * *